July 7, 1953
S. P. ROBINSON
2,644,769
COATING OF AMMONIUM NITRATE FERTILIZER
Filed Dec. 31, 1948
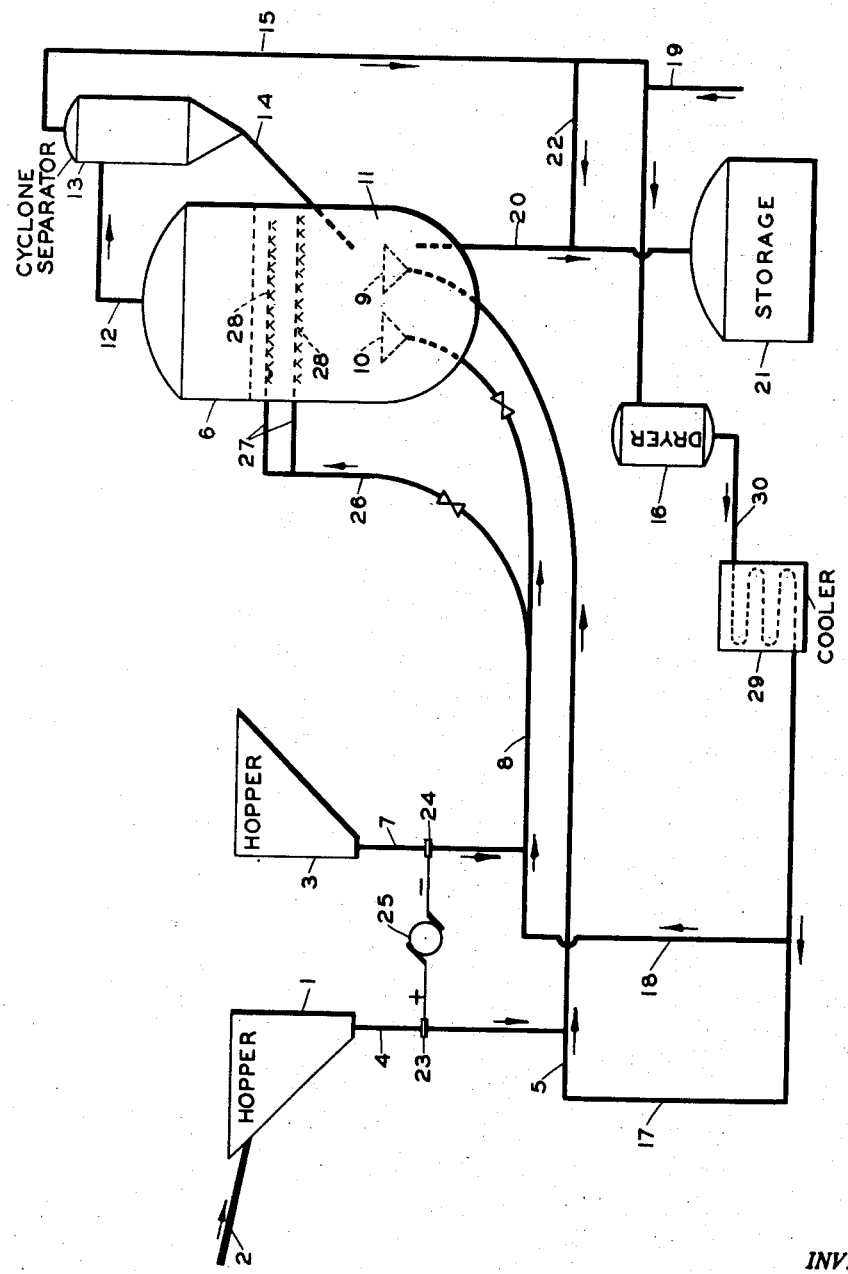
INVENTOR.
S. P. ROBINSON
BY *Hudson & Young*
ATTORNEYS Patented July 7, 1953

2,644,769

UNITED STATES PATENT OFFICE 2,644,769

COATING OF AMMONIUM NITRATE FERTILIZER

Sam P. Robinson, Bartlesville, Okla., assignor to Phillips Petroleum Company, a corporation of Delaware Application December 31, 1948, Serial No. 68,471

7 Claims. (Cl. 117—17)

This invention relates to a method for coating ammonium nitrate crystals. In one of its aspects ammonium nitrate is coated with a combination neutralizing and coating agent. In one of its embodiments, ammonium nitrate crystals are suspended in a carrier gas with a finely divided neutralizing and coating agent in such manner that the said crystals become coated and neutralized under carefully controlled conditions to produce uniformly coated crystals not heretofore obtainable.

Ammonium nitrate is a valuable agricultural fertilizing agent and is employed in large quantities by agriculturists to replenish the nitrogen extracted from the soil by commercially grown plants. As produced by most modern processes, ammonium nitrate is in the form of fine crystals or prills. These crystals are inherently deliquescent and readily absorb moisture from the surrounding atmosphere. The absorbed water causes the crystals to agglomerate into large lumps of difficulty manageable size which must necessarily be broken into a finer form prior to use of the compound as a fertilizer or otherwise. The absorbed water increases the weight of the ammonium nitrate crystals and hence it also increases the shipping costs per unit of the pure anhydrous compound. Various means have been suggested by the prior art to prevent or to limit the absorption of water by ammonium nitrate. One such means involves sealing the nitrate with a dry atmosphere in a container. This means is obviously inapplicable to the handling of large lots of the nitrate as, for example, where the nitrate is shipped in carload or truckload quantities. Another means which is more successful involves coating the ammonium nitrate crystals with a moisture excluding material. The process for applying such a coating usually is accomplished by tumbling the nitrate crystals and the coating material together in a mixing vessel until the crystals have been thoroughly coated. This particular prior art method has been proven to involve several important disadvantages. One such disadvantage is that a large excess of coating material usually must be employed to secure a continuous coating around each nitrate crystal. This large excess inevitably results in an unduly thick coating of some crystals and an unevenly distributed coating on other crystals. On the other hand, if the amount of coating material employed is reduced sufficiently to prevent unduly thick coating of the nitrate crystals, the coating around many crystals is discontinuous and these crystals absorb moisture through their uncoated or insufficiently coated areas. Thus, the tumbling method of coating results either in excessively thick continuous coatings or in thin discontinuous coatings of the crystals. Another disadvantage of the tumbling process is that the coating material is applied to the crystals at a rate which is largely uncontrollable. The nitrate crystals usually contain a small portion of free acid, such as nitric, which is desirably neutralized by reaction with the coating material. Hence an alkaline coating material is usually employed in the dual role of a coating and neutralizing agent. The neutralization reaction between the coating material and the free acid will produce water which, if the crystals are sufficiently hot, will flash into gaseous steam. Further, in many cases, the coating agent is composed largely of a carbonate which, upon reaction with the free acid of the nitrate crystal, evolves gaseous carbon dioxide. In the tumbling process and in other prior art processes for coating of nitrate crystals, the coating material is applied at an uncontrolled rate to each crystal so that many nitrate crystals are coated suddenly with a coat of material sufficiently thick to substantially prevent diffusion from the nitrate crystal of the gases formed during the neutralization reaction. As the concentration of these gases increases, an internal pressure is built up inside the coat of material with a resultant complete rupture or pin-holding thereof. The nitrate crystal thereby loses the complete protection of its coat of material theretofore applied. Thus, there is a need for a method for coating ammonium nitrate crystals by which each crystal may be coated with a minimum of evenly distributed continuous coating material applied at a uniform, controlled rate.

According to this invention, it has been found that ammonium nitrate crystals can be uniformly coated with a minimum quantity of coating material applied at a controlled rate by suspending the said crystals and the finely divided coating material in a carrier gas in such a manner that the suspension forms a fluidized bed. Still according to this invention, it has been found that a coating and neutralizing material can be applied to ammonium nitrate crystals at a controlled rate sufficiently low to allow effusion of neutralization gases through the gradually applied coating to prevent rupture of the crystal coating, by depositing the coating on the crystals while in a fluidized bed. Still according to this invention, it has been found further that the control of the rate of deposition and the distribution of coating material on ammonium nitrate crystals can be improved by inducing or depositing an electrostatic charge of opposite value on the nitrate crystals and on the coating material particles, respectively, prior to suspending them in a fluidized bed. And still further according to this invention, it has been found that the rate of deposition of the coating particles onto the nitrate crystals can be controlled by varying the difference in particle size between the said crystals and the said particles.

In order to better understand this invention, it will now be described in one of its embodiments with particular reference to the attached drawing.

In the drawing, hot ammonium nitrate crystals produced by a process not herein shown are transported to bin 1 by an auger or other transport device 2. The crystals of ammonium nitrate are preferably small enough in size to be capable of being fluidized, that is, suspended in a gas stream flowing at moderate velocities, say from 10 to 100 feet per second. The nitrate crystals from their production step can be reduced in size by grinding to increase the ease with which they can be suspended in a fluid state in a carrier gas. Preferably the nitrate crystals are within the size range between 20 and 100 mesh. A finely divided coating material such as fuller's earth, diatomaceous earth, kieselguhr, calcium carbonate, etc. or a mixture of such materials is stored in bin 3. The coating material is sufficiently finely divided to enable its ready suspension in flowing gas streams. Preferably, the size of the coating material particles is of the order of that of from 50 to 600 mesh, preferably from 100 to 400 mesh, still more preferably from 150 to 300 mesh. The size of the coating material particles should be considerably smaller than the crystal size of the ammonium nitrate in order to ensure an evenly deposited, thin coating on the crystals. The fluidizable nitrate crystals are passed via line 4 into line 5. The finely divided fluidizable coating material is passed via line 7 into line 8. A carrier gas is introduced through lines 5 and 8 to transport the nitrate crystals and coating material, respectively, to vessel 6. The carrier gas can be any non-reactive gas such as nitrogen or air. The gas should be dried to remove any water vapor present therein by means which will be described later. Removal of water from the carrier gas prevents absorption of the water by subsequently contacted nitrate crystals and hence such a drying step avoids substantially all deliquescence of the said crystals prior to their coating. The flow rate of the gas through lines 5 and 8 must be high enough to suspend therein the materials from lines 4 and 7 and ordinarily will be of the order of 20 to 100 feet per second, preferably about 80 feet per second. Each of the carrier gases and its entrained material from lines 5 and 8 enters vessel 6 through their respective distributors 9 and 10. The rate of flow of carrier gases and the size of the vessel 6 are such as to permit the formation of a dense suspension or fluidized bed of nitrate crystals and coating material in the bottom of the vessel. This dense suspension or fluid bed resembles a boiling liquid in appearance and is very turbulent. The density, height and degree of turbulence of the fluid bed 11 can be readily controlled by varying the rate of carrier gas flow therethrough. The carrier gas emerges from bed 11 carrying in suspension varying amounts of the coating material and the coated or partially coated crystals of nitrate. The gaseous suspension passes via line 12 to a cyclone or centrifugal separator 13 wherein substantially all of the suspended solid material is separated from the carrier gases. The separated solid material is returned to bed 11 via line 14 for further processing therein. The solid-free gases from separator 13 pass through line 15 to dryer 16. Dryer 16 can be of any suitable type but is preferably a bauxite-filled vessel. The dry carrier gases are then returned to lines 5 and 8 via lines 17 and 18, respectively. Additional or make-up gases may be added to line 15 through line 19.

After the nitrate crystals have been sufficiently coated in vessel 6, the suspension is withdrawn therefrom and defluidized in line 20 and then sent to storage 21. Carrier gas from line 15 can be introduced into vertical line 20 through line 22 at a rate sufficient to strip undeposited coating material from the coated nitrate crystals passing therethrough. The rate of introduction of such gas is sufficient to suspend the fine coating material particles and hence carry them upwardly into the vessel 6. On the other hand, the rate should be low enough to permit the nitrate crystals to descend through line 20 to storage 21.

Although the coated ammonium nitrate crystals prepared as described immediately above are vastly superior to any heretofore prepared by other methods, a still further improvement of their quality can be realized by employing another embodiment of this invention. In this additional embodiment, the crystals of ammonium nitrate and the particles of finely divided coating material are electrostatically charged with charges of the opposite sign, respectively. Illustratively, grid devices 23 and 24 are located within lines 4 and 7, respectively. These grid devices are connected with direct current generator 25 in the manner shown. Thus, one grid will be positively charged and the other grid will be negatively charged. Generator 25 can be any source of high voltage direct current. The grids 23 and 24 can be of any conventional type such as parallel wires arranged transversely across lines 4 and 7 but insulated therefrom. The spacing of the parallel wires should be such as to allow free flow of solid materials therethrough. Preferably the spacing of the grids and the amount of voltage applied thereto is properly chosen so that a corona discharge takes place, since the voltages associated with such discharge are found to have the necessary effect in charging the atmosphere adjacent the grids and the particles of material passing through the grids. Usually a voltage of 100,000 volts is sufficient. The various lines and equipment which contact the charged particles should be electrically insulated from ground by lining with an electrical insulating material, etc. After the nitrate crystals and the particles of coating material are electrostatically charged, they are passed via lines 5 and 8, respectively, into the fluid bed 11 of vessel 6 and treated thereafter as described above. It is thus apparent that if the nitrate crystals are all charged with electrostatic charges of the same sign, each charged crystal will exert a repelling force on every other charged crystal thereby preventing agglomeration of the crystals prior to deposition of the coating on each crystal. Likewise, the coating material particles will repel each other since they are each charged with electrostatic charges of the same sign. On the other hand, the nitrate crystals will exert an attracting force on the coating material particles since the crystals are charged with electrostatic charges of opposite sign to those on the coating material particles. Thus there is a selective attraction for the particles by the crystals which causes the particles to deposit on the crystals instead of on each other. Further, as will be more fully explained below, the rate of deposition of the coating material particles onto the nitrate crystals can be controlled by regulating the amount of electrostatic charge on the particles and crystals, respectively.

The rate of deposition of coating material onto the nitrate crystals can be readily controlled by varying the density of the nitrate-coating material suspension in fluidized bed 11. The density of the bed is a function of the rate of flow of the carrier gases therethrough. For example, if any given amount of nitrate crystals and coating material are contained in bed 11, then the concentration of these materials as expressed in pounds per cubic foot of bed content depends upon the height of the bed 11 in the vessel 6. If this height is increased, the weight of the suspended solids per cubic foot must decrease. Hence, the rate at which the coating material particles collide and deposit on the nitrate crystals must likewise decrease since they are in a more highly dispersed phase.

The rate of collision and deposition can be further controlled by varying the amount of electrostatic charge deposited on the nitrate crystals and on the coating material particles, respectively. For example, if a very large electrostatic charge of one sign is deposited on the nitrate crystals and a very large charge of the opposite sign is deposited on the coating material particles, there will be a very strong attraction between the particles and the crystals. Hence, the rate of deposition of the coating material onto the nitrate crystals will be very rapid. By suitable coordination between the density of the solid suspension in bed 11 and the quantity of electrostatic charge on the suspended particles, the collision and deposition rate of the coating material onto the nitrate crystals can be varied over a wide range. The maximum rate at which the coating material can be deposited on the nitrate crystals and yet allow adequate diffusion of neutralization gases (formed as explained above) is a function which will vary with each system and can be determined by mere routine test.

Another variable which affects the rate of deposition of coating material is the relative difference in size between the coating material particles and the nitrate crystals. Preferably, the coating material particles are considerably smaller than the nitrate crystals. In general, the smaller the coating material particles relative to the nitrate crystals, the more uniform will be the coating around each nitrate crystal. In addition, of the relative difference in size is great, the coating particles can be applied at a faster rate than when the difference in size is small and yet allow adequate diffusion of the neutralization gases. Thus, the density of the suspension in bed 11 and the electrostatic charge can be coordinated with the relative difference in particle size of the two materials in order to further control the rate of deposition of the coating material. Preferably, the particle size of the coating material is from 100 to 400 mesh still more preferably from 150 to 300 mesh. The particle size of nitrate crystals is preferably from 50 to 200 mesh.

In another embodiment of this invention, the coating material can be injected into the fluid bed 11 at several points. A portion of the total quantity of the coating material desired to be used is passed into fluidized bed 11 through distributor 10 as above described. The remaining portion of coating material, either before or after receiving an electrostatic charge from charging device 25, is diverted through line 26 into one or more injection headers 27 and distribution devices 28. The latter can be any type as, for example, spiders, rings, etc. Thus, when the coating material is added to the bed 11 at a series of different points, the concentration of free coating material at different heights therein can be controlled so as to further control the rate of deposition of the particles onto the nitrate crystals.

The thickness of the coating on the nitrate crystals can be readily controlled by adjusting the withdrawal rate through line 20. That is, the residence time of the crystals in vessel 6 determines the thickness of their coating. It should be readily perceivable that employment of this invention will result not only in a controlled rate of deposition of a coating material onto the nitrate crystals but will further result in the said deposition being of a uniform thickness and hence continuous around each crystal.

In those cases where the nitrate crystals in bin 1 have not been cooled after their manufacture, they can be readily cooled during the coating process described herein by the carrier gases provided a cooler 29 is inserted in line 30. Thus, cool carrier gases passing through line 17 will cool the hot nitrate crystals while the said crystals are suspended therein. Further cooling can occur in fluidized bed 11.

Variation and modification are possible within the scope of the appended claims to the invention, the essence of which is that ammonium nitrate crystals can be uniformly coated at a controlled rate by fluidizing the same under carefully controlled conditions as set forth herein.

I claim:

1. In a process wherein fluidizable ammonium nitrate crystals are coated with fluidizable particles of calcium carbonate having a particle size smaller than that of said ammonium nitrate crystals, the improved method of coating said crystals whereby the said coating is uniformly deposited on said crystals at a controlled rate which comprises electrostatically charging the said crystals and the said calcium carbonate particles with charges of opposite value, respectively; suspending the said electrostatically charged crystals and the said electrostatically charged calcium carbonate particles in separate streams of nitrogen, separately passing said streams to a coating zone to form a fluidized bed of said particles and said crystals and controlling the rate of deposition of said calcium carbonate particles on said crystals by adjusting the rate of flow of said nitrogen through the said bed, by adjusting the amount of electrostatic charge on the said particles and the said crystals, respectively, and by adjusting the relative difference in particle size of the said calcium carbonate particles and the said crystals.

2. In a process wherein fluidizable ammonium nitrate crystals having a size range between 20 and 100 mesh are coated with fluidizable particles of calcium carbonate having a particles size between 100 and 400 mesh, the improved method of coating said crystals whereby the said coating is uniformly deposited on said crystals at a controlled rate which comprises electrostatically charging the said crystals and said calcium carbonate particles with charges of opposite value, respectively; suspending the electrostatically charged crystals in a first stream of nitrogen, suspending the said electrostatically charged calcium carbonate particles in a second stream of nitrogen, passing said first and second nitrogen streams containing said suspensions separately into a coating zone wherein the said crystals and said particles form a fluidized bed, and controlling the rate of deposition of said particles on said crystals by adjusting the rate of flow of nitrogen through said bed and by adjusting the amount of electrostatic charge on said crystals and said particles, respectively, so that vapors formed in said crystals being coated can diffuse therefrom without rupturing the said coating.

3. In a process wherein fluidizable ammonium nitrate crystals having a size range between 20 and 100 mesh are coated with fluidizable particles of a coating material selected from the group consisting of fuller's earth, diatomaceous earth, kieselguhr and calcium carbonate, said particles having a size range between about 100 and 400 mesh, the improved method of coating said crystals whereby the coating is uniformly deposited on said crystals at a controlled rate which comprises; controllably electrostatically charging said crystals and said coating material particles with charges of opposite polarity, respectively; suspending the electrostatically charged crystals in a first stream of an inert gas and suspending said electrostatically charged particles in a second stream of inert gas; passing said first and second gas streams separately into a coating zone wherein said crystals and said particles form a fluidized bed, and controlling the rate of deposition of said particles on said crystals by adjusting the rate of flow of said inert gas through said bed and by having adjusted the amount of electrostatic charge on said crystals and said particles, respectively.

4. In a process wherein fluidizable ammonium nitrate crystals having a size range between 20 and 100 mesh are coated with fluidizable particles of a coating material selected from the group consisting of fuller's earth, diatomaceous earth, kieselguhr and calcium carbonate, said particles having a size range between about 100 and 400 mesh, the improved method of coating said crystals whereby the coating is uniformly deposited on said crystals at a controlled rate which comprises; controllably electrostatically charging said crystals and said coating material particles with charges of opposite polarity, respectively; suspending the electrostatically charged crystals in a first stream of an inert gas and suspending said electrostatically charged particles in a second stream of inert gas; passing said first and second gas streams separately into a coating zone wherein said crystals and said particles form a fluidized bed, and controlling the rate of deposition of said particles on said crystals by adjusting the rate of flow of said inert gas through said bed and by having adjusted the amount of electrostatic charge on said crystals and said particles, respectively, and by adjusting the relative difference in particle size of said coating material particles and said crystals.

5. In a process wherein fluidizable ammonium nitrate crystals are coated with fluidizable particles of a combination coating and neutralizing material selected from the group consisting of fuller's earth, diatomaceous earth, kieselguhr, and calcium carbonate and having a particle size smaller than that of said ammonium nitrate crystals, the improved method of coating said crystals whereby the said coating is uniformly deposited on said crystals at a controlled rate which comprises electrostatically charging the said crystals and the said coating material particles with charges of opposite sign, respectively; suspending the said electrostatically charged crystals and the said electrostatically charged material particles in separate streams of an inert carrier gas, separately passing said streams to a coating zone to form a fluidized bed of said particles and said crystals and controlling the rate of deposition of said particles on said crystals by adjusting the rate of flow of said carrier gas through the said bed and by adjusting the relative difference in particle size of the said particles and the said crystals.

6. In a process wherein fluidizable ammonium nitrate crystals are coated with fluidizable particles of a combination coating and neutralizing material selected from the group consisting of fuller's earth, diatomaceous earth, kieselguhr, and calcium carbonate and having a particle size smaller than that of said ammonium nitrate crystals, the improved method of coating said crystals whereby the said coating is uniformly deposited on said crystals at a controlled rate which comprises electrostatically charging the said crystals and the said coating material particles with charges of opposite sign, respectively; suspending the said electrostatically charged crystals and the said electrostatically charged material particles in separate streams of an inert carrier gas, separately passing said streams to a coating zone to form a fluidized bed of said particles and said crystals and controlling the rate of deposition of said particles on said crystals by adjusting the rate of flow of said carrier gas through the said bed, by adjusting the amount of electrostatic charge on the said particles and the said crystals, respectively, and by adjusting the relative difference in particle size of the said particles and the said crystals.

7. The process of claim 5 in which the coating material has a particle size of from 50 to 600 mesh.

SAM P. ROBINSON.

References Cited in the file of this patent

UNITED STATES PATENTS

| Number | Name | Date |
|---|---|---|
| 1,964,744 | Odell | July 3, 1934 |
| 1,999,573 | Odell | Apr. 30, 1935 |
| 2,008,469 | Prince | July 16, 1935 |
| 2,136,069 | Beekhuis | Nov. 8, 1938 |
| 2,270,341 | Ransburg | Jan. 20, 1942 |
| 2,307,253 | Yee et al. | Jan. 5, 1943 |
| 2,399,717 | Arveson | May 7, 1946 |
| 2,407,151 | Glogau | Sept. 3, 1946 |
| 2,443,673 | Atwell | June 22, 1948 |
| 2,459,836 | Murphree | Jan. 25, 1949 |
| 2,478,912 | Garbo | Aug. 16, 1949 |
| 2,511,088 | Whaley | June 13, 1950 |
| 2,561,392 | Marshall | July 24, 1951 |